US009569366B2

(12) United States Patent
Pangborn et al.

(10) Patent No.: US 9,569,366 B2
(45) Date of Patent: *Feb. 14, 2017

(54) SYSTEM AND METHOD TO PROVIDE NON-COHERENT ACCESS TO A COHERENT MEMORY SYSTEM

(71) Applicant: Cavium, Inc., San Jose, CA (US)

(72) Inventors: Jeffrey A. Pangborn, Saratoga, CA (US); Gregg A. Bouchard, Georgetown, TX (US); Rajan Goyal, Saratoga, CA (US); Richard E. Kessler, Northborough, MA (US); Aseem Maheshwari, Fremont, CA (US)

(73) Assignee: Cavium, Inc., San Jose, CA (US)

( * ) Notice: Subject to any disclaimer, the term of this patent is extended or adjusted under 35 U.S.C. 154(b) by 79 days.

This patent is subject to a terminal disclaimer.

(21) Appl. No.: 14/466,384

(22) Filed: Aug. 22, 2014

(65) Prior Publication Data
US 2014/0372709 A1 Dec. 18, 2014

Related U.S. Application Data

(63) Continuation of application No. 13/280,756, filed on Oct. 25, 2011, now Pat. No. 8,850,125.

(51) Int. Cl.
*G06F 12/0888* (2016.01)
*G06F 12/08* (2016.01)
*G06F 12/0831* (2016.01)

(52) U.S. Cl.
CPC ........ *G06F 12/0888* (2013.01); *G06F 12/08* (2013.01); *G06F 12/0831* (2013.01)

(58) Field of Classification Search
CPC .................................................. G06F 12/0888
See application file for complete search history.

(56) References Cited

U.S. PATENT DOCUMENTS 5,548,724 A     8/1996 Akizawa et al.
5,875,464 A *   2/1999 Kirk ..................... G06F 12/1054
                                                    711/121

(Continued)

FOREIGN PATENT DOCUMENTS

CN      101040256 A    9/2007
CN      101158927 A    4/2008
WO      WO 2006/031551 A2    3/2006

OTHER PUBLICATIONS

Charles Severance Kevin Dowd, "High Performance Computing", Nov. 13, 2009, Daniel Williamson, section 3.1.7 Improving Memory Performance, http://cnx.org/contents/u4IVVH92@5.2:Yzqv11nj@3/Improving-Memory-Performance.*

(Continued)

*Primary Examiner* — Eric S Cardwell
(74) *Attorney, Agent, or Firm* — Hamilton, Brook, Smith & Reynolds, P.C.

(57) ABSTRACT

In one embodiment, a system comprises a memory and a memory controller that provides a cache access path to the memory and a bypass-cache access path to the memory, receives requests to read graph data from the memory on the bypass-cache access path and receives requests to read non-graph data from the memory on the cache access path. A method comprises receiving a request at a memory controller to read graph data from a memory on a bypass-cache access path, receiving a request at the memory controller to read non-graph data from the memory through a cache access path, and arbitrating, in the memory controller, among the requests using arbitration.

25 Claims, 4 Drawing Sheets

(56) References Cited

U.S. PATENT DOCUMENTS

| | | |
|---|---|---|
| 6,467,002 B1 | 10/2002 | Yang |
| 6,820,215 B2 | 11/2004 | Harper et al. |
| 6,888,836 B1 | 5/2005 | Cherkasova |
| 7,558,925 B2 | 7/2009 | Bouchard et al. |
| 7,594,081 B2 * | 9/2009 | Bouchard et al. ............ 711/138 |
| 8,560,757 B2 | 10/2013 | Pangborn et al. |
| 2002/0087913 A1 | 7/2002 | Harper et al. |
| 2010/0114973 A1 | 5/2010 | Goyal |
| 2014/0013061 A1 | 1/2014 | Pangborn et al. |

OTHER PUBLICATIONS

International Search Report and Written Opinion of the International Searching Authority in International Application No. PCT/US2012/057269, dated Feb. 5, 2013.

"Single Chip 8 to 32-core OCTEON II™ MIPS64 Processors Provide up to 48 GHz of 64-bit Compute with Unmatched L3-L7 Data and Security Acceleration to Deliver 40Gbps of throughput While Slashing Power Consumption for Next Generation Internet Infrastructure Applications," *Cavium Network Unveils OCTEON II CN68XX—Industry's Highest-Performance Multi-Core Processors for Energy-Efficient Data Center, Mobile Internet and the Borderless Enterprise* (May 2010).

* cited by examiner

SYSTEM AND METHOD TO PROVIDE NON-COHERENT ACCESS TO A COHERENT MEMORY SYSTEM

RELATED APPLICATION

This application is a continuation of U.S. application Ser. No. 13/280,756, filed Oct. 25, 2011. The entire teachings of the above application are incorporated herein by reference.

BACKGROUND

A coherent memory system in a computer typically includes a high-capacity off-chip external memory coupled with a relatively smaller internal on-chip memory cache. The cache mirrors a portion of the data stored in the off-chip memory. A cache controller directs read requests of addresses of the external memory to the cache when the cache has copies of the data corresponding with those addresses. A read request to access the cache can be serviced with a lower access time than a read request to access the off-chip external memory.

In a coherent memory system with an external memory and a cache, the external memory and the cache remain coherent. In such a coherent memory system, the data stored in the cache either matches the copy of the data at an address in the external memory or is an updated version of the data for that address. Writes to external memory addresses are first written to the cache. Later, a hardware mechanism copies the data from the cache to the external memory under certain conditions.

A typical computer system generally tightly couples the cache with the external memory within a single memory sub-system. Upon any read request, the cache controller determines if the cache is storing the data at the requested address of the external memory. If the cache is storing the data, the memory sub-system reads the data directly from the cache. If the cache is not storing the data, the request is forwarded to the external memory.

The cache stores recently accessed data or likely-to-be accessed data in a plurality of "cache lines," which are minimum units of storage within the cache. However, storing data in the cache that is eventually not used or is used infrequently is inefficient and detrimental to overall system performance because the cache capacity is significantly smaller than the capacity of the external memory. The memory sub-system passes a requested read address to the cache controller. If the controller indicates data for the external memory that is present in the cache, the version of the data in the cache is returned. If the data for the requested external memory address is not in the cache, a scenario known as a "cache miss," the memory sub-system directs the read request to the external memory. In the "cache miss" scenario, the memory subsystem copies large quantities of sequential data bytes to a "cache line" within the cache. Typical cache systems anticipate that a read request to a particular external memory address is followed by a read request to the next higher external memory address. Caching data for sequential memory addresses allows subsequent sequential read requests to the memory sub-system to access data stored in the faster cache instead of requiring additional read requests to access data in the external memory.

SUMMARY

In one embodiment, a system comprises a memory and a memory controller that provides a cache access path to the memory and a bypass-cache access path to the memory, receives requests to read graph data from the memory on the bypass-cache access path and receives requests to read non-graph data from the memory on the cache access path.

In another embodiment, a method comprises receiving one or more requests at a memory controller to read graph data from a memory on a bypass-cache access path, receiving one or more requests at the memory controller to read non-graph data from the memory through a cache access path, and arbitrating, in the memory controller, among the requests using fixed priority arbitration, round-robin arbitration, or weighted round-robin arbitration.

In yet another embodiment, the cache access path receives requests to read graph data and non-graph data from the memory. The memory stores graph data and non-graph data. The non-graph data includes packet data.

In yet another embodiment, the memory controller reads the requested graph data or non-graph data. The memory controller receives requests to read graph data and non-graph data from a cache controller. The memory controller is configured to arbitrate among requests from the cache access path and the bypass-cache access path using weighted round-robin arbitration.

In yet another embodiment, the memory controller receives requests to read graph data from a co-processor. The co-processor can be a deterministic automata processing unit, a nondeterministic automata processing unit, or a hyper-finite automata processing unit. The memory controller receives requests to write data to memory on the cache access path. The co-processor is configured to stop sending read requests to the memory controller to stop the reading of selected graph data from the memory on the bypass-cache access path when the selected graph data is being written to the memory on the cache access path.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments follows.

In systems where memory read requests use non-near-sequential addresses that result in many cache misses, copying data to a cache line in the cache during cache misses is inefficient because the memory controller wastes processing time reading from the external memory and the cache wastes processing and storage resources copying data that is never read from the cache. Instead, other system processes could take advantage of the fast speed of the cache. Allowing read accesses to bypass the cache and directly access the external memory prevents copying data to the cache that is not accessed again. A bypass-cache access path allows a read of memory that provides only the requested amount of data without reading additional data to fill a full cache line of data.

Before describing example embodiments of the present invention in detail, an example network security processor in which the embodiments may be implemented is described immediately below to help the reader understand the inventive features of the present invention.

Figure 1:
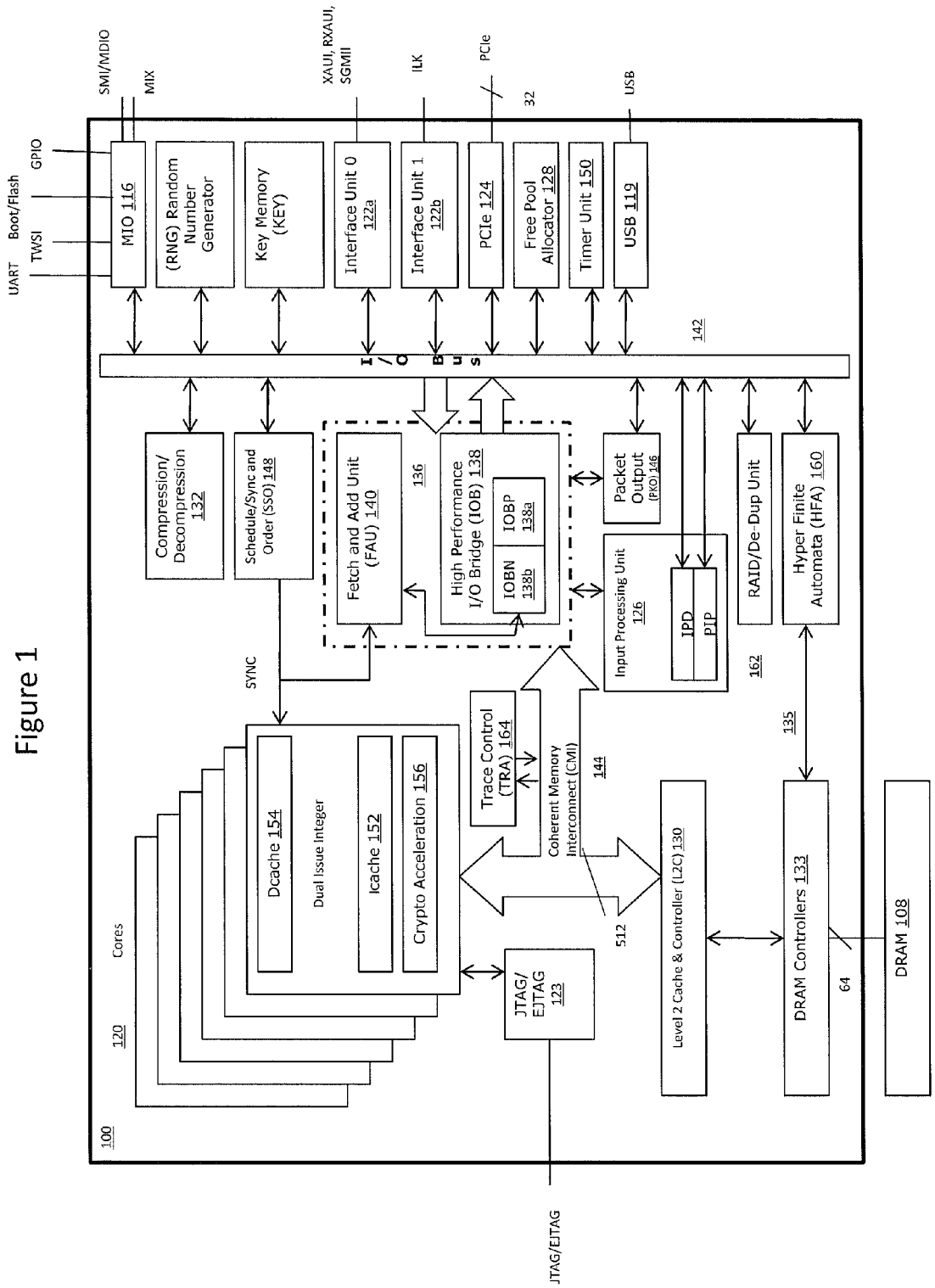
FIG. 1 is a diagram illustrating a network services processor.

FIG. 1 is a block diagram of a network services processor 100. The network services processor 100 delivers high application performance using at least one processor core 120.

The network services processor 100 processes Open System Interconnection network L2-L7 layer protocols encapsulated in received packets. As is well-known to those skilled in the art, the Open System Interconnection (OSI) reference model defines seven network protocol layers (L1-L7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communication between users, for example, file transfer and electronic mail.

The network services processor 100 may schedule and queue work (packet processing operations) for upper level network protocols, for example L4-L7, and allow processing of upper level network protocols in received packets to be performed to forward packets at wire-speed. Wire-speed is the rate of data transfer of the network over which data is transmitted and received. By processing the protocols to forward the packets at wire-speed, the network services processor does not slow down the network data transfer rate.

A packet is received for processing by a plurality of interface units 122a and 122b. A packet can also be received by a PCIe interface 124. The interface units 122a and 122b perform pre-processing of the received packet by checking various fields in the L2 network protocol header included in the received packet and then forward the packet to a packet input unit 126. At least one interface unit 122a can receive packets from a plurality of X Attachment Unit Interfaces (XAUI), Reduced X Attachment Unit Interfaces (RXAUI), or Serial Gigabit Media Independent Interfaces (SGMII). At least one interface unit 122b can receive connections from an Interlaken Interface (ILK).

The packet input unit 126 performs further pre-processing of network protocol headers (e.g., L3 and L4 headers) included in the received packet. The pre-processing includes checksum checks for TCP/User Datagram Protocol (UDP) (L3 network protocols).

A free-pool allocator 128 maintains pools of pointers to free memory in a Level 2 Cache & Controller 130 and external DRAM 108. The Level 2 Cache & Controller 130 can also include a cache memory and cache controller. The packet input unit 126 uses one of the pools of pointers to store received packet data in the cache memory of the Level 2 Cache & Controller 130 or external DRAM 108 and another of the pools of pointers to allocate work queue entries for the processor cores 120.

The packet input unit 126 then writes packet data into buffers in Level 2 Cache & Controller 130 or external DRAM 108. Preferably, the packet data is written into the memories in a format convenient to higher-layer software executed in at least one of the processor cores 120. Thus, further processing of higher level network protocols is facilitated.

The network services processor 100 can also include one or more application specific co-processors. These co-processors, when included, offload some of the processing from the cores 120, thereby enabling the network services processor to achieve high-throughput packet processing. For example, a compression/decompression co-processor 132 is provided that is dedicated to performing compression and decompression of received packets. Other embodiments of co-processing units include the RAID/De-Dup Unit 162, which accelerates data striping and data duplication processing for disk-storage applications.

Another co-processor is a Hyper Finite Automata (HFA) unit 160 which includes dedicated HFA inspection engines adapted to accelerate pattern and/or signature matching necessary for anti-virus, intrusion-detection systems and other content-processing applications. Using a HFA Unit 160, pattern and/or signature matching is accelerated, for example being performed at rates upwards of multiples of tens of gigabits per second. The HFA Unit 160, in some embodiments, could include any of a Deterministic Finite Automata (DFA), Non-deterministic Finite Automata (NFA), or HFA inspection engine.

An I/O interface 136 manages the overall protocol and arbitration and provides coherent I/O partitioning. The I/O interface 136 includes an I/O bridge 138 and a fetch-and-add unit 140. The I/O Bridge includes two bridges, an I/O Packet Bridge (IOBP) 138a and an I/O Bus Bridge (IOBN) 138b. The I/O Packet Bridge 138a is configured to manage the overall protocol and arbitration and provide coherent I/O portioning with primarily packet input and output. The I/O Bus Bridge 138b is configured to manage the overall protocol and arbitration and provide coherent I/O portioning with primarily the I/O Bus. Registers in the fetch-and-add unit 140 are used to maintain lengths of the output queues that are used for forwarding processed packets through a packet output unit 146. The I/O bridge 138 includes buffer queues for storing information to be transferred between a coherent memory interconnect (CMI) 144, an I/O bus 142, the packet input unit 126, and the packet output unit 146.

The miscellaneous I/O interface (MIO) 116 can include auxiliary interfaces such as General Purpose I/O (GPIO), Flash, IEEE 804 two-wire Management Interface (MDIO), Serial Management Interrupt (SMI), Universal Asynchronous Receiver-Transmitters (UARTs), Reduced Gigabit Media Independent Interface (RGMII), Media Independent Interface (MII), two wire serial interface (TWSI) and other serial interfaces.

The network services processor 100 may also include a Joint Test Action Group (JTAG) Interface 123 supporting the MIPS EJTAG standard. According to the JTAG and MIPS EJTAG standards, a plurality of cores within the network services processor 100 will each have an internal Test Access Port (TAP) controller. This allows multi-core debug support of the network services processor 100.

A Schedule/Sync and Order (SSO) module 148 queues and schedules work for the processor cores 120. Work is queued by adding a work queue entry to a queue. For example, a work queue entry is added by the packet input unit 126 for each packet arrival. A timer unit 150 is used to schedule work for the processor cores 120.

Processor cores 120 request work from the SSO module 148. The SSO module 148 selects (i.e., schedules) work for one of the processor cores 120 and returns a pointer to the work queue entry describing the work to the processor core 120.

The processor core 120, in turn, includes instruction cache 152, Level-1 data cache 154, and crypto acceleration 156. In one embodiment, the network services processor 100 includes 32 superscalar Reduced Instruction Set Computer (RISC)-type processor cores 120. In some embodiments, each of the superscalar RISC-type processor cores 120 includes an extension of the MIPS64 version 3 processor core. In one embodiment, each of the superscalar RISC-type processor cores 120 includes a cnMIPS II processor core.

The cache memory of the Level 2 Cache & Controller 130 and the external DRAM 108 are shared by all of the processor cores 120 and I/O co-processor devices. Each processor core 120 is coupled to the Level 2 Cache & Controller 130 by the CMI 144. The CMI 144 is a communication channel for all memory and I/O transactions between the processor cores 120, the I/O interface 136 and the Level 2 Cache & Controller 130. In one embodiment, the CMI 144 is scalable to 32 processor cores 120, supporting fully-coherent Level 1 data caches 154 with write through. Preferably the CMI 144 is highly-buffered with the ability to prioritize I/O. The CMI 144 is coupled to a trace control unit 164 configured to capture bus requests so software can later read the request and generate a trace of the sequence of events on the CMI 144.

The cache memory of the Level 2 Cache & Controller 130 maintains memory reference coherence. It returns the latest copy of a memory block for every fill request, whether the block is stored in the cache memory of the Level 2 Cache & Controller 130, in external DRAM 108, or is "in-flight." It also stores a duplicate copy of the tags for the data cache 154 in each processor core 120. It compares the addresses of cache-block-store requests against the data-cache tags, and invalidates (both copies) a data-cache tag for a processor core 120 whenever a store instruction is from another processor core or from an I/O component via the I/O interface 136.

In some embodiments, a plurality of DRAM controllers 133 supports up to 128 gigabytes of DRAM. In one embodiment, the plurality of DRAM controllers includes four DRAM controllers, each of the DRAM controllers 133 supporting 32 gigabytes of DRAM. Preferably, each DRAM controller 133 supports a 64-bit interface to DRAM 108. Additionally, the DRAM controller 133 can support preferred protocols, such as the DDR-III protocol.

After a packet has been processed by the processor cores 120, the packet output unit 146 reads the packet data from the cache memory of the Level 2 Cache & Controller 130/DRAM 108, performs L4 network protocol post-processing (e.g., generates a TCP/UDP checksum), forwards the packet through the interface units 122a and 122b or the PCIe interface 124 and frees the cache memory of the Level 2 Cache & Controller 130/DRAM 108 used by the packet.

The DRAM Controllers 133 manage in-flight transactions (loads/stores) to/from the DRAM 108. In some embodiments, the DRAM Controllers 133 include four DRAM controllers, the DRAM 108 includes four DRAM memories, and each DRAM controller is connected to a DRAM memory. The HFA unit 160 is coupled directly to the DRAM Controllers 133 on a bypass-cache access path 135. The bypass-cache access path 135 allows the HFA unit to read directly from the DRAM memory 108 without using the cache memory of the Level 2 Cache & Controller 130, which can improve efficiency for HFA operations.

Figure 2:
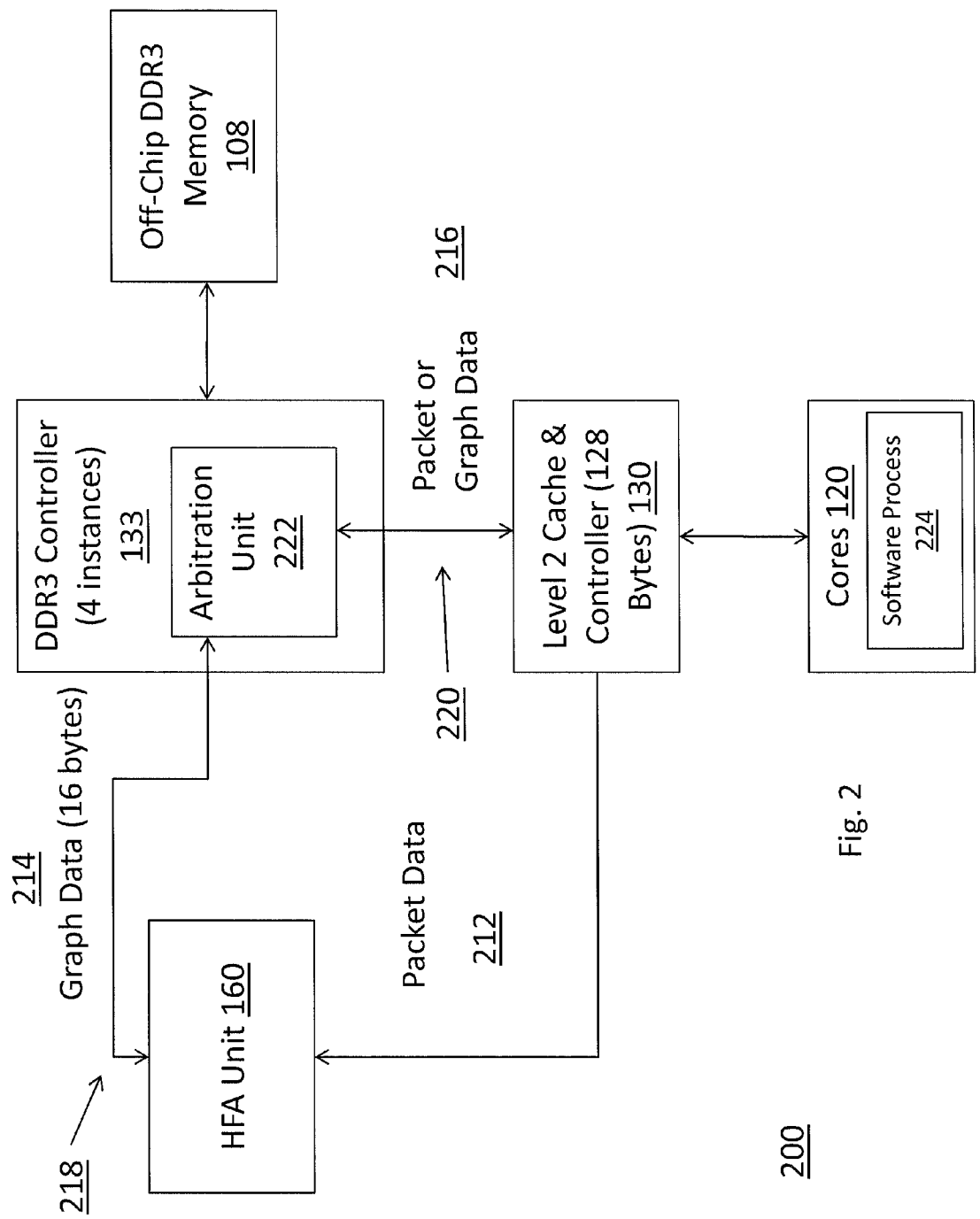
FIG. 2 is a diagram illustrating a memory sub-system with a cache access path and a bypass-cache access path.

FIG. 2 is a diagram illustrating a memory sub-system 200 with a cache access path ("CAP") 220 and a bypass-cache access path ("BCAP") 218. The memory sub-system 200 includes the Level 2 Cache & Controller 130 coupled with a memory controller 133 through a CAP 220. In some embodiments, the memory controller 133 is a plurality of memory controllers. The HFA Unit 160 is coupled with the memory controller 133 through a BCAP 218. In some embodiments, the HFA Unit 160 includes a plurality of HFA inspection engines. The memory controller 133 is coupled with a memory 108, and is configured to issue read and write requests to the memory 108.

A software process 224 runs on a processor core 120 that is coupled with the Level 2 Cache & Controller 130. The software process 224 is configured to request to read and write to memory through the Level 2 Cache & Controller 130. The operation of Level-2 caches such as Level 2 Cache & Controller 130 is well known by a person of ordinary skill in the art. Upon receiving a read request for data in external memory 108 that is not in the Level 2 Cache & Controller 130, the Level 2 Cache & Controller 130 fetches a cache line amount of data. The cache line can include 128 bytes of sequential data. A person of skill in the art can recognize that a cache line could include other amounts or sequences of data from memory. A cache line that fetches 128 bytes of sequential data is provided as an example throughout the specification, but could include other embodiments of cache lines that fetch other quantities of data.

The HFA Unit 160 is configured to request graph data 214 from the memory controller 133 along a BCAP 218. The HFA Unit 160 typically requests graph data 214 16 bytes at a time. A person of ordinary skill in the art can recognize that 16 bytes is an example size of graph data and that graph data can be read in other quantities. The HFA Unit 160 generally requests non-sequentially addressed graph data 214 because the pointers in the graph data 214 could point to any address in the memory 108, not necessarily at the next sequential memory address. The HFA Unit 160 requests to read graph data 214 with addresses that cannot be accurately predicted because each subsequent address request depends on the byte the HFA inspection engines inside the HFA Unit 160 is processing and the current state of the HFA engines inside the HFA Unit 160. In other words, the HFA Unit 160 does not necessarily issue read requests for sequentially addressed graph data 214, but issues read requests for graph data 214 scattered throughout the memory 108.

The HFA Unit 160 issues requests for graph data 214 directly to the memory controller 133 along the BCAP 218, rather than through the Level 2 Cache & Controller 130 along the CAP 220. In this manner, the HFA Unit 160 requests to read the graph data 214 without the Level 2 Cache & Controller 130 reading additional bytes to its cache line that are not likely to be accessed again through the Level 2 Cache & Controller 130. The graph data 214 requested on the BCAP 218 is not forwarded to the Level 2 Cache & Controller 130. The Level 2 Cache & Controller 130 does not receive a notification that the HFA Unit 160 issued a read request on the BCAP 218 or that the memory controller 133 returned graph data 214 along the BCAP 218.

From the perspective of the HFA Unit 160, the BCAP 218 provides a lower latency path for servicing graph data 214 read requests than the CAP 220. The CAP 220 includes several intermediary blocks. The latencies through these intermediary blocks significantly add to read response latency. The BCAP 218 does not include these intermediary blocks and therefore provides a lower latency for reading graph data 214 by the HFA Unit 160.

The HFA Unit 160 is configured to read only graph data 214 along the BCAP 218. The HFA Unit 160 cannot issue write requests or read packet data along the BCAP 218. The Level 2 Cache & Controller 130 receives all requests to write to external memory 108 along the CAP 220. If the BCAP 218 received write requests, the data stored in the memory 108 written through the BCAP 218 can be out of sync with the corresponding data stored in the cache memory of the Level 2 Cache & Controller 130. A subsequent read request to the Level 2 Cache & Controller 130 for that address may result in a 'cache hit' because the Level 2 Cache & Controller 130 may wrongly determine it had an up-to-date copy, and may return the out of sync data it is storing, instead of returning the updated value in the memory 108. An additional process is necessary to synchronize the cache memory of the Level 2 Cache & Controller 130 with the memory 108.

Software process 224 writes and updates graph data 216 infrequently compared to the frequency the HFA Unit 160 reads graph data 214. Software process 224 loads and updates graph data 216 through the CAP 220 via the Level 2 Cache & Controller 130. When software process 224 loads and updates graph data 216, the process of committing the writes to memory 108 has an overhead. However, the overhead is not significant because, as explained above, writing or updating graph data is infrequent.

The Level 2 Cache & Controller 130 can also issue write requests to the memory. The Level 2 Cache & Controller 130 stores packet data locally and commits its local copy of the packet data to the memory 108 under certain conditions. The Level 2 Cache & Controller 130, however, should always immediately commit graph data to memory 108 because the HFA Unit 160 cannot access the Level 2 Cache & Controller 130 via BCAP 218 and needs to be able to read up-to-date graph data from memory 108. The commit guarantees that graph data 214 accessible on the BCAP is always available in the memory 108 and does not solely reside in the cache memory of the Level 2 Cache & Controller 130. The data in the cache memory of the Level 2 Cache & Controller 130 is inaccessible to the BCAP 218. If the Level 2 Cache & Controller 130 does not immediately commit the graph data to the memory 108 and instead waits for certain conditions, the HFA Unit 160 reads out-of-date graph data 214 from the memory 108 along the BCAP 218, when the up-to-date graph data is stored only in the cache memory of the Level 2 Cache & Controller 130. Software process 224 can issue an instruction to perform a write commit operation or a hardware process can trigger a write commit after a write to the Level 2 Cache & Controller 130.

In addition, when the Level 2 Cache & Controller 130 is writing a portion of graph data to the memory 108, the HFA Unit 160 needs to be configured to not read from that portion of graph data. The software process 224 initiates all writes to the Level 2 Cache & Controller 130. At the same time, the software process 224 instructs the HFA Unit 160 to stop reading from the addresses of memory the Level 2 Cache & Controller 130 is writing. When the Level 2 Cache & Controller 130 finishes writing the graph data, the software process 224 instructs the HFA Unit 160 that it can begin reading from the areas of memory that the Level 2 Cache & Controller 130 just wrote to. The software also transmits packet data 212 to the HFA Unit 160. The HFA Unit 160 then interprets the packet data 212 with the graph data 214 that it reads from memory.

The Level 2 Cache & Controller 130 issues both read and write requests along the CAP 220 for both packet and graph data 216. Software process 224 issues read requests for graph data using either the CAP 220 or the BCAP 218. The Level 2 Cache & Controller 130 responds to read requests by determining if the Level 2 Cache & Controller 130 is storing the requested packet or graph data 216. If the Level 2 Cache & Controller 130 is storing the requested packet or graph data 216, called a "cache hit," it reads the data from its internal memory and returns it to the software process 224. If the Level 2 Cache & Controller 130 is not storing the requested packet or graph data 216, called a "cache miss," it issues a request to the memory controller 133 to read the data from memory 108.

As noted above, in a cache miss, the Level 2 Cache & Controller 130 fills its cache lines with a 128-byte block that reads beyond the requested data in anticipation that the software process 224 later requests the rest of the 128-byte block so the Level 2 Cache & Controller 130 can load it from the faster cache memory of the Level 2 Cache & Controller 130. While this approach is advantageous in many systems, it slows the HFA Unit 160 because the HFA Unit has to wait longer for graph data 214. When the Level 2 Cache & Controller 130 receives a read request for packet data, however, the 128-byte data returned to the Level 2 Cache & Controller 130 for each read request is more efficient than issuing a plurality of read requests for 16-byte quantities of packet data directly to memory because packets can be hundreds or thousands of bytes in length. In addition, software process 224 processes packet data serially, which better suits the predictive nature of the Level 2 Cache & Controller 130.

The memory controller 133 may include an arbitration unit 222. The arbitration unit 222 is configured to arbitrate between read and write requests among the BCAP 218 and the CAP 220. In one embodiment, the arbitration unit 222 in the memory controller 133 performs weighted round-robin arbitration among read requests from the BCAP 218 and read and write requests from the CAP 220. The arbitration unit 222 in the memory controller 133 may also perform round-robin arbitration, fixed priority arbitration, or any other method of arbitration among the read requests from the BCAP 218 and read and write requests from the CAP 220. The arbitration unit is configured to select write requests from the Level 2 Cache & Controller 130 such that a burst of write requests is not broken up. The memory 108 imposes an additional latency when it switches between a reading mode and a writing mode. The arbitration unit 222 can reduce the occurrence of this particular latency by reducing the amount of times the memory 108 switches between reading mode and writing mode.

The arbitration unit 222 selects requests from the CAP and the BCAP in the order the requests are issued, respectively. However, as noted above, the arbitration unit 222 can give one path a higher priority over the other path, such as when the Level 2 Cache & Controller 130 issues a burst of write requests. The arbitration unit 222 handles requests from each path in order, relative to the path the requests were issued on, however.

Figure 3:
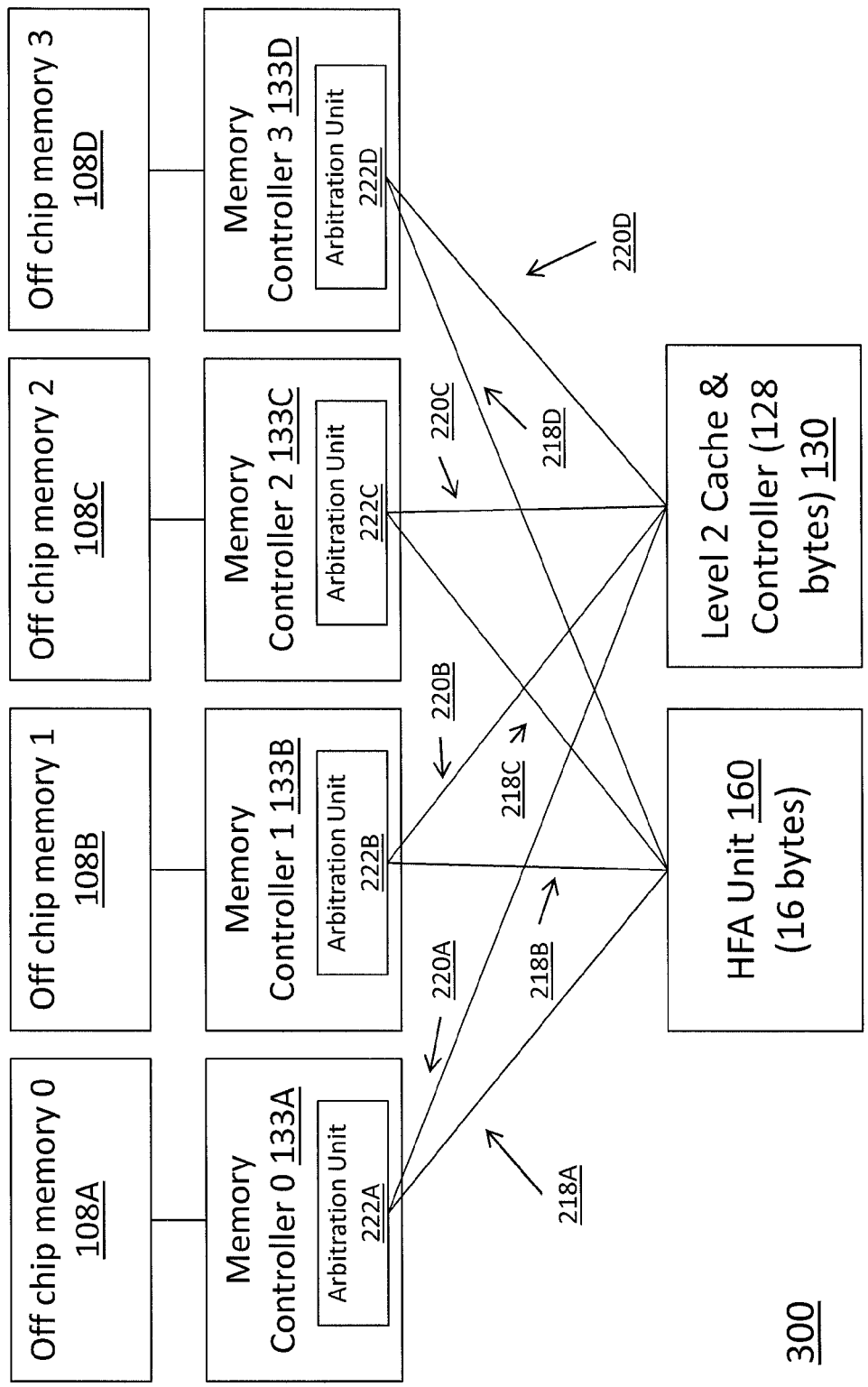
FIG. 3 is a diagram illustrating a system with a plurality of memory controllers coupled with a plurality of memories.

FIG. 3 is a diagram illustrating a system 300 with a plurality of memory controllers 133A-D coupled with a plurality of memories 108A-D. The system 300 illustrated in FIG. 3 operates similarly to that of FIG. 2, but illustrates a plurality of memory controllers 133A-D coupled with a plurality of BCAPs 218A-D and CAPs 220A-D. The HFA Unit 160 is coupled with the arbitration units 222A-D within the memory controllers 133A-D by the BCAPs 218A-D. Likewise, the Level 2 Cache & Controller 130 is coupled with the arbitration units 222A-D through the CAPs 220A-D. Each memory controller 133A-D is coupled with a memory 108A-D.

Figure 4:
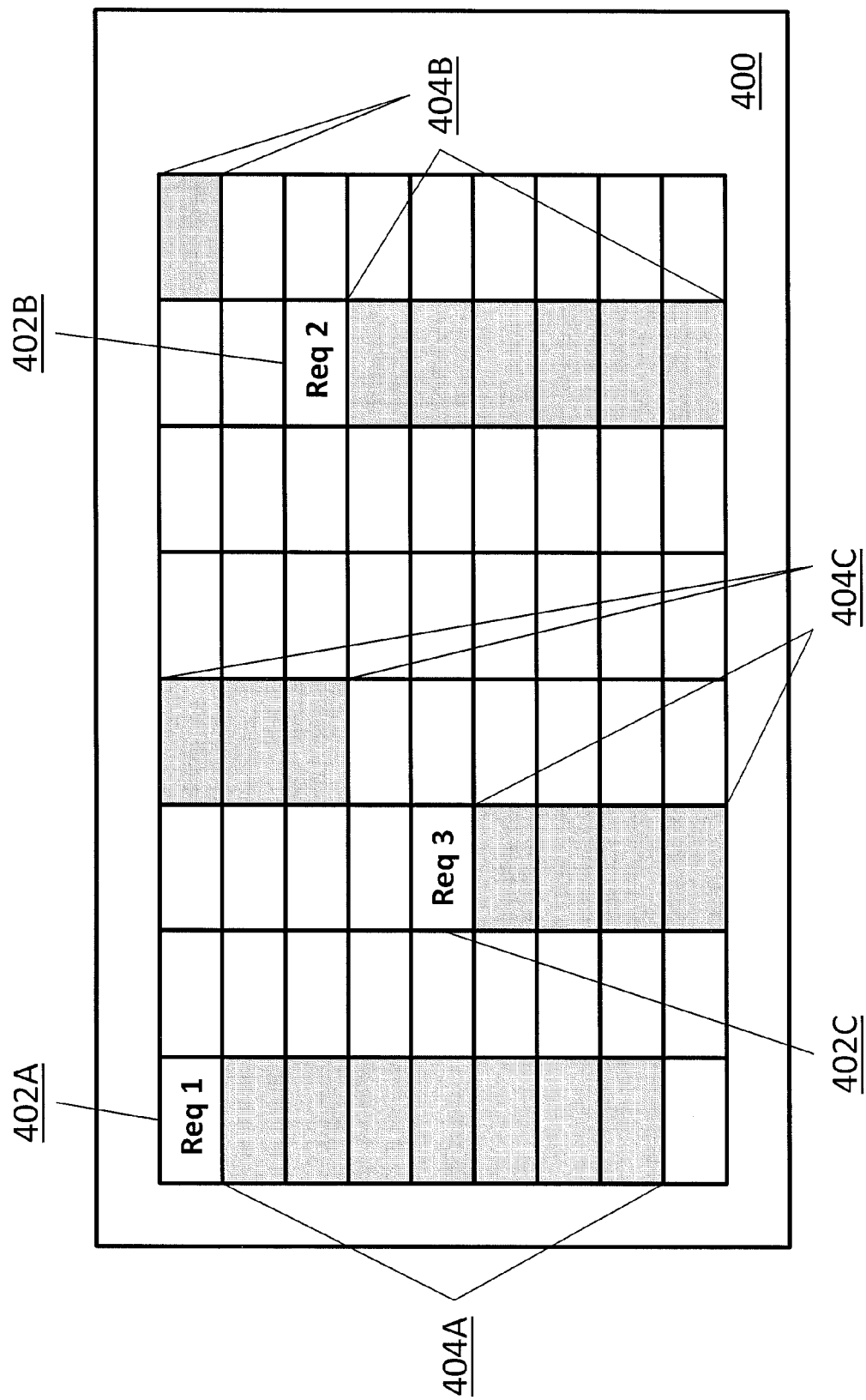
FIG. 4 is a diagram illustrating a memory address space including graph data.

FIG. 4 is a diagram illustrating a memory space 400 including graph data. In this illustration of a memory space 400, the addresses first increment vertically from top to bottom and then left to right for the next sequential address. Referring to FIG. 4 as well as FIG. 2, each box within the memory space 400 represents 16 bytes of data, the size of a HFA Unit 160 request. A HFA Unit 160 can request any address within the memory space 400. As an illustrative example, the HFA Unit 160 can issue a request for a first address 402A (Req 1). The HFA Unit 160 receives data for the first request 402A along the BCAP and analyzes the data to determine its next memory request. If the HFA Unit 160 requests the first address 402A along the CAP, the Level 2 Cache & Controller 130 reads not only the 16 bytes in first address 402A, but also fetches the 112 bytes in a first cache memory block 404A as part of a complete 128-byte block. The BCAP 218 avoids the Level 2 Cache & Controller 130 and prevents the Level 2 Cache & Controller 130 from unnecessarily reading the 112 bytes of data in the first cache memory block 404A. Storing the first cache memory block 404A in the Level 2 Cache & Controller 130 is inefficient because the graph data 214 is likely not accessed from the Level 2 Cache & Controller 130 and the 112 bytes consume memory addresses in the Level 2 Cache & Controller 130 that other system applications could use more efficiently.

The subsequent read requests from the HFA Unit 160 illustrate the reason the 112 bytes of data the Level 2 Cache & Controller 130 reads are unnecessary when reading graph data. The HFA Unit 160 processes the data from the first address 402A and reads a pointer to the next memory address it needs to process, a second address 402B. The pointer does not necessarily point to an address next to or near the first address 402A. The HFA Unit 160 issues a second read request to the second address 402B using the BCAP 218. Second address 402B is not within the memory range of the first cache memory block 404A. As with the first request, if the HFA Unit 160 requested the second address 402B along the CAP, the Level 2 Cache & Controller 130 reads not only second address 402B, but also the 112 bytes in a second cache memory block 404B to read a complete 128-byte block.

Similarly, the HFA Unit 160 processes the data from the second address 402B and reads a pointer to the next memory address it needs to process, a third address 402C. The HFA Unit 160 issues a third read request to the third address 402C. Third address 402C is not within the memory range of either the first cache memory block 404A or the second cache memory block 404B. As with the first and second requests, if the HFA Unit 160 requested the third address 402C along the CAP, the Level 2 Cache & Controller 130 reads not only third address 402C, but also the 112 bytes in a third cache memory block 404C to read a complete 128-byte block.

Bypassing the Level 2 Cache & Controller 130 through the BCAP 218 avoids such unnecessary cache fills and thus prevents the Level 2 Cache & Controller 130 from fetching 112 bytes of data every time the HFA Unit 160 requests graph data. Fetching unnecessary data wastes resources of the Level 2 Cache & Controller 130 and adds latency to each memory read issued by the HFA Unit 160. A system that uses a BCAP as described above in this specification avoids fetching these unnecessary data bytes. Therefore, a system with a BCAP only reads relevant graph data 402A, 402B, and 402C without reading the extraneous graph data 404A, 404B, and 404C and is more efficient.

While this invention has been particularly shown and described with references to example embodiments thereof, it will be understood by those skilled in the art that various changes in form and details may be made therein without departing from the scope of the invention encompassed by the appended claims.

What is claimed is:

1. A system comprising:
a memory;
a memory controller providing a cache access path to the memory and a bypass-cache access path to the memory, the memory controller receiving requests to access finite automata (FA) data at the memory on the bypass-cache access path and receiving requests to access non-FA data at the memory on the cache access path, the finite automata (FA) data including non-deterministic finite automata (NFA) data.

2. The system of claim 1 wherein the memory controller receives requests to access FA data and non-FA data at the memory on the cache access path.

3. The system of claim 1 wherein the non-FA data comprises packet data.

4. The system of claim 1 wherein the memory stores FA data and non-FA data.

5. The system of claim 1 wherein the memory controller reads the requested FA data or non-FA data.

6. The system of claim 1 wherein the memory controller receives the requests to access FA data from a co-processor.

7. The system of claim 6 wherein the co-processor includes at least one of a deterministic automata processing unit and a nondeterministic automata processing unit.

8. The system of claim 6 wherein the co-processor is configured to stop sending access requests to the memory controller to stop the access of selected FA data from the memory when the selected FA data is being written to the memory on the cache access path.

9. The system of claim 1 wherein the memory controller receives requests to access FA data and non-FA data from a cache controller.

10. The system of claim 1 wherein the memory controller is configured to arbitrate among requests from the cache access path and the bypass-cache access path using at least one of fixed priority arbitration, round-robin arbitration, and weighted round-robin arbitration.

11. The system of claim 1 wherein the FA data is non-sequentially addressed data and the non-FA data is sequentially addressed data.

12. The system of claim 1 further comprising a cache, the cache associated with the memory and wherein the cache access path provides access to the memory through the cache and the bypass-cache access path provides access to the memory by bypassing the cache.

13. The system of claim 12 wherein the cache is coherently associated with the memory.

14. A method comprising:
receiving one or more requests at a memory controller to access finite automata (FA) data at a memory on a bypass-cache access path, the finite automata (FA) data including non-deterministic finite automata (NFA) data;
receiving one or more requests at the memory controller to access non-FA data at the memory through a cache access path;

arbitrating, in the memory controller, among the requests using at least one of fixed priority arbitration, round-robin arbitration, and weighted round-robin arbitration.

15. The method of claim 14 further comprising receiving one or more requests at the memory controller to access FA data and non-FA data at the memory through a cache access path.

16. The method of claim 14 further comprising reading from the memory the requested FA data or non-FA data.

17. The method of claim 14 wherein the non-FA data comprises packet data.

18. The method of claim 14 wherein the memory controller receives the requests to access FA data from a co-processor.

19. The method of claim 18 wherein the co-processor includes at least one of a deterministic automata processing unit and a nondeterministic automata processing unit.

20. The method of claim 14 wherein the memory controller receives the requests to access non-FA data and FA data from a cache controller through the cache access path.

21. The method of claim 14 further comprising stopping the access of selected FA data from the memory while the selected FA data is being written to the memory on the cache access path.

22. The method of claim 14 wherein the memory stores FA data and non-FA data.

23. The method of claim 14 wherein the FA data is non-sequentially addressed data and the non-FA data is sequentially addressed data.

24. The method of claim 14 wherein a cache is associated with the memory and the cache access path provides access to the memory through the cache and the bypass-cache access path provides access to the memory by bypassing the cache.

25. The method of claim 24 wherein the cache is coherently associated with the memory.

\* \* \* \* \*